Patented Mar. 16, 1943

2,314,090

UNITED STATES PATENT OFFICE 2,314,090

LEAVENING PREPARATION

Arthur E. Huff, Lemay, Mo., assignor to Monsanto Chemical Company, St. Louis, Mo., a corporation of Delaware No Drawing. Application July 21, 1939, Serial No. 285,664

7 Claims. (Cl. 99—95)

This invention relates to an improved leavening agent of the calcium phosphate type.

Mono calcium orthophosphate has been known and used as a leavening agent for more than eighty years. As ordinarily prepared this substance reacts very rapidly with alkaline bicarbonates, with the result that during the preparation of the dough the major proportion of the carbon dioxide is liberated and lost, and hence has no beneficial effect upon the baked product.

Numerous attempts have accordingly been made with the object of decreasing the rate of reaction of mono calcium phosphate with bicarbonates in wet dough mixtures, with the object of preventing the loss of leavening gas before baking.

Almost thirty years ago the production and use of a calcium acid pyrophosphate leavening agent made by heating mono calcium orthophosphate was proposed. The material, as thus produced, while possessing a slower reaction rate than the ordinary hydrated mono calcium orthophosphate still was too fast and possessed little or no reserve leavening power. The product, as thus produced, was also quite unstable according to present day standards.

More recently the production of a stabilized form of anhydrous mono calcium phosphate has been proposed. While pure anhydrous mono calcium phosphate is extremely hygroscopic, the addition of certain impurities to the reacting ingredients during manufacture has been found to impart a degree of stability to such anhydrous product. The anhydrous product as thus stabilized, while possessing a somewhat slower rate of reaction in dough mixtures, has been found to lack the desired reserve leavening power and stability toward reversion on exposure to humid atmosphere.

I have now discovered that a form of calcium acid pyrophosphate possessing excellent reserve leavening power and stability can be produced without the incorporation therein of impurities.

Although my product consists essentially of calcium acid pyrophosphate, when baked into biscuits, it lacks the objectionable "pyro" taste so often associated with pyrophosphate-containing leavening agents.

The "delayed" or "reserve" leavening power of my improved product will be evident from the following considerations:

When ordinary hydrated or anhydrous mono calcium orthophosphate is reacted in a stirred dough mixture, essentially all of the $CO_2$ gas which the leavening mixture is capable of generating is liberated within ten minutes after the liquid ingredient of the dough is added.

The effect may also be illustrated by determining, over a period of time, the volume of carbon dioxide liberated from a wet dough mixture. While the known types of orthophosphate leavening agent liberate in ten minutes considerably more than 70 per cent of the contained $CO_2$ in the leavening mixture, my improved form of calcium acid pyrophosphate liberates 65% of the contained gas, and may be made to liberate less than this; in some cases as little as 40% to 50% in 10 minutes.

Illustrative of this effect, the following data obtained by means of the dough reaction rate determination are typical of samples of ordinary hydrated mono calcium orthophosphate, heat-treated anhydrous mono calcium orthophosphate, and of a sample of improved calcium acid pyrophosphate:

$CO_2$ evolved basis per cent of total contained at 26° C.

|  | Time in minutes | | | | | | | |
|---|---|---|---|---|---|---|---|---|
|  | 1 | 2 | 3 | 4 | 5 | 10 | 15 | 20 |
| Hydrated M. C. P. | 52 | 61 | 65 | 68 | 70 | 73 | 74 | 74 |
| Anhydrous M. C. P. | 14 | 29 | 45 | 58 | 65 | 73 | 74 | 75 |
| Improved calcium acid pyrophosphate | 13 | 15 | 19 | 23 | 27 | 44 | 55 | 66 |

Hence, if the dough leavened with one of the known mono calcium orthophosphate leavening agents is allowed to stand ten minutes before rolling and baking, the specific volume of the resulting biscuits is essentially the same whether an ordinary hydrated acid phosphate is employed or whether the leavening acid is of the above-mentioned anhydrous form.

The dough reaction rate method referred to is described in Cereal Chemistry, vol. 8, page 423 (1931).

My improved form of acid calcium pyrophosphate may be produced directly by crystallization after reaction of lime and strong phosphoric acid. The following examples illustrate two methods by which my product may be made:

EXAMPLE 1

To 890 grams of strong phosphoric acid (78% $P_2O_5$) add 2,500 cc. of diethyl phthalate and heat to 185° C., then add 140 grams of calcium oxide, CaO. During the course of the reaction, the temperature rises to 200° C. Stir well for one hour, cool slowly to 50° C. with stirring, filter and wash the crystals with acetone or alcohol. The product consists of agglomerates of very finely divided crystals of acid calcium pyrophosphate, $CaH_2P_2O_7$ (ordinarily 90%) containing a small amount of acid calcium orthophosphate. The crystal structure of the individual crystals cannot be distinguished under a magnification of 200 diameters.

In place of the diethyl phthalate I may employ generally any organic solvent miscible or non-miscible with acid and having a boiling point somewhat above the range of 185° to 200° C.

This product has a reserve leavening characteristic as indicated by the following rate of reaction in a dough mixture:

| Time in minutes | 1 | 2 | 3 | 4 | 5 | 10 | 15 | 20 |
|---|---|---|---|---|---|---|---|---|
| Per cent $CO_2$ evolved | 12 | 19 | 24 | 28 | 33 | 49 | 60 | 66 |

EXAMPLE 2

To 3910 grams of a solution of 90% $H_3PO_4$ (64.5% $P_2O_5$) heated to 185° C., add 190 grams of $Ca(OH)_2$ with stirring. This quantity of lime is approximately 15% of that required for the reaction to form mono calcium phosphate. During addition of the lime the temperature rises almost to 200° C. The reaction product is cooled to 140°–150° C. while stirring and maintained at this temperature for six hours. The reaction mixture is then maintained at a temperature of 110° C. for an additional six hours. The temperature is then dropped to 75° C., maintained here for ten hours, and then filtered. The crystals are washed with alcohol and acetone, and then dried. The product analyzes approximately 90% $CaH_2P_2O_7$ and 10% calcium orthophosphate. By controlled cooling the time necessary for growth of satisfactory crystals may be decreased.

This product has a reserve leavening characteristic as indicated by the following rate or reaction in a dough mixture:

| Time in minutes | 1 | 2 | 3 | 4 | 5 | 10 | 15 | 20 |
|---|---|---|---|---|---|---|---|---|
| Per cent $CO_2$ evolved | 15 | 24 | 30 | 36 | 42 | 65 | 74 | 75 |

The calcium acid pyrophosphate as prepared in Examples 1 and 2 is a very finely divided white powder, made up of regular crystals mixed with agglomerated crystals. The crystals are non-porous. The product produced by Example 2 contains a considerable percentage of material which is coarser than 200 mesh. The coarse product is composed of agglomerates of very small crystals.

The coarse product larger than 200 mesh, comprising the agglomerated or larger single crystals, may be ground. The ground product will be found to have the same dough reaction rate and baking characteristics as the naturally occurring finer particles, since I do not rely upon an artificially formed coating upon the individual crystals to lower the reaction rate.

Upon exposure to humid atmospheres my product has been found to absorb only a small amount of moisture during the first twenty-four hours of exposure. Continuing exposure to the same humid atmosphere results in no further absorption of moisture.

My product, after exposure to humid atmospheres, does not change its reaction rate or baking characteristics. It may accordingly be employed as an ingredient in self-rising flours or in baking powders generally without danger of deterioration.

It is obvious that many different ways are used by the housewife in the preparation and baking of biscuits, and that the time between the mixing of the dough and the rolling and baking is subject to much variation. An ideal leavening agent should therefore have considerable reserve leavening power in order to meet successfully the great variety of prevailing consumer practices. These consumer practices are illustrated by the following considerations:

In certain parts of the country, notably the South, it is the prevailing practice to mix the biscuit dough for a longer period of time than in the North. There is also the personal element as well as the factor of uncontrollable interruptions, both of which introduce variation in time between the mixing of the dough and the rolling and cutting of the biscuit. An additional variation affecting the leavening held by a dough is the common practice of re-rolling and cutting biscuits from the scrap dough which remains after the first cutting. Still another variation is the common consumer practice of mixing and then holding the dough, as in a refrigerator, for subsequent rolling and baking.

All of these consumer practice variations illustrate the need for a leavening agent having reserve leavening power.

My improved calcium acid pyrophosphate has been found to possess great reserve leavening power so that the many variations in consumer practices illustrated above do not affect the resulting baked product to so great an extent as these variations affect the leavening agents hitherto known and used.

The reserve leavening power of my improved form of calcium acid pyrophosphate is illustrated by the following tabulation comparing the factor defined as "Lightness" of baked biscuits—which factor is the ratio of the actual volume of the biscuit to the weight of biscuit—with the time elapsed between mixing of the dough and the rolling and cutting thereof.

"Lightness"=actual volume (cc.)/weight of baked biscuit (gms.)

| Elapsed time between mixing, rolling, and cutting | Hydrated M. C. P. | Anhydrous M. C. P. stabilized by heat | Improved calcium acid pyrophosphate product of example 1 |
|---|---|---|---|
| 0 minutes | 2.54 | 3.10 | 3.06 |
| 2 minutes | 2.38 | 2.62 | 3.16 |
| 3 minutes | 2.29 | 2.38 | 2.97 |
| 4 minutes | 2.31 | 2.38 | 2.78 |
| 6 minutes | 2.24 | 2.34 | 2.57 |

Another factor of importance to the housewife in the baking of biscuits leavened with calcium acid phosphate baking powders is introduced by the variation in climatic conditions occurring over the various parts of the country where these products are used. Moreover, it is the practice in some cases to use previously cooled ingredients, particularly milk which has been kept in a refrigerator for some period of time. In other cases the ingredients are not previously cooled and may even be used at quite high temperatures. A desirable characteristic in a general leavening agent, therefore, would be for it to possess a minimum of acceleration due to temperature changes, which may in many cases be uncontrollable by the user.

My improved calcium acid pyrophosphate leavening agent has been found to possess a minimum of acceleration caused by variations in temperature during the mixing of the ingredients of the dough. As an example of this effect, I give the following figures obtained by the dough reaction rate test at various mixing temperatures comparing a heat-treated anhydrous monocalcium orthophosphate with my improved form of calcium acid pyrophosphate.

*Per cent $CO_2$ evolved in two minutes from a stirred dough at temperatures shown*

|  | Temperature of mixing, °C. | | | | |
| --- | --- | --- | --- | --- | --- |
|  | 25° | 30° | 35° | 40° | Difference in per cent evolved between 25–40° |
| Heat-treated anhydrous calcium orthophosphate | 27 | 39 | 60 | 71 | 44 |
| Improved calcium acid pyrophosphate | 19 | 25 | 30 | 40 | 21 |

While the above figures show that my improved form of leavening agent is more resistant to the temperatures ordinarily encountered during the mixing and handling of the dough prior to baking, it is not, however, resistant to the temperatures encountered during baking. Temperatures such as are used in the production of baked products (90° C. to 105° C.) and in fact temperatures lower than this, but above those encountered in mixing, are sufficient to cause a complete and rapid acceleration of the leavening reaction before the gluten of the flour is set, so that biscuits baked with my product do not exhibit the cracked side wall and mottled crust due to unreacted bicarbonate and acid leavening which are characteristic of an excessively slow leavening agent.

The accepted standard method for the evaluation of the acidity of a calcium phosphate leavening agent is the testing procedure of the American Association of Cereal Chemists, published in the Handbook on Cereal Laboratory Methods, 3rd ed. 1935, page 117, method 5B.

When the ordinary acid calcium orthophosphate baking acids are subjected to this test, the results obtained may be used as a measure of the acidity for the production of baked goods of the desired neutrality. When my improved acid calcium pyrophosphate is tested by this same procedure a value is obtained by the test which would indicate a neutralizing value of from 60 to 65. Actually my product may be baked at a neutralizing value of from 80 to 84. The excess acidity available for baking is therefore approximately 20 units. Therefore, when employing my improved product as a baking acid, it is desirable that actual baking tests be made to determine the neutralizing value of my product on the basis of the desired pH of the baked product.

Upon exposure of my improved product to humid atmospheres, I find it to be substantially stable and to retain its reaction rate and baking characteristics unchanged. This property is illustrated by the following values determined upon the product made according to Example 2 above:

*Exposure tests at 75% relative humidity at 30° C.*

|  | Time of exposures, hours | | | |
| --- | --- | --- | --- | --- |
|  | 0 | 12 | 24 | 48 |
| Ignition loss, percent | 10.8 | 10.9 | 10.9 | 11.0 |
| Dough reaction rate: | | | | |
| 2 min., percent $CO_2$ evolved | 25.7 | 26.3 | 26.3 | 25.4 |
| 10 min., per cent $CO_2$ evolved | 72.4 | 72.4 | 72.6 | 72.6 |
| 15 min., per cent $CO_2$ evolved | 78.1 | 78.1 | 78.3 | 78.3 |

The remarkable stability of my product is further shown by the reaction rate of a different sample made according to Example 2 which liberated 24.8% $CO_2$ in 2 minutes before exposure to a humid atmosphere and after 384 hours exposure to 75% relative humidity at 30° C. it liberated 24.7% $CO_2$ in 2 minutes. The stability of my improved product is particularly valuable when compounded into self-rising flours, where the flour carries a relatively high moisture content which is customarily added for best milling practice.

The impurities present in my improved product are only those occurring normally in the lime and phosphoric acid and are present in amounts not objectionable from the standpoint of a high quality food product. Since I am able to use the highest grades of phosphoric acid for the production of my improved baking acid, which acid is substantially free of the impurities present in the lower grades of acid, it results that the impurities present in my product are substantially only those occuring in the lime with which the acid is reacted. My product ordinarily will contain the following amounts of impurities:

| | Per cent |
| --- | --- |
| $Al_2O_3$ | .018 |
| $K_2O$ | .065 |
| $Na_2O$ | .140 |
| $Fe_2O_3$ | .043 |
| $SO_3$ | .059 |

The ignition loss as determined upon my product is found to be in the range from 9% to 11%. Ordinarily my product will contain in the neighborhood of 90% calcium acid pyrophosphate anhydrous and 10% acid calcium orthophosphate. My product is substantially free of metaphosphates.

What I claim is:

1. A leavening acid comprising a major proportion of crystallized non-porous anhydrous calcium acid pyrophosphate and a minor proportion of calcium orthophosphate crystallized therewith, said leavening acid having a reaction rate, such that when reacted with sodium bicarbonate in a dough mixture, said acid will liberate between 40% and 65% of the contained gas in 10 minutes at a dough temperature of 26° C.

2. The leavening acid defined in claim 1 which contains approximately 10% of the orthophosphate.

3. The leavening acid defined in claim 1, which when reacted with sodium bicarbonate in a dough mixture will liberate between 40% and 50% of the contained gas in 10 minutes at a dough temperature of 26° C.

4. A leavening acid comprising a major proportion of non-porous crystallized anhydrous calcium acid pyrophosphate and a minor proportion of monocalcium orthophosphate intercrystallized therewith, which acid is relatively slowly reactive with sodium bicarbonate in a wet dough mix and having the property of retaining its slow reaction rate after exposure to humid atmospheres.

5. The leavening acid defined in claim 4 which is in the form of agglomerated fine crystals.

6. The process for producing a leavening acid comprised essentially of anhydrous calcium acid pyrophosphate comprising reacting lime and a strong phosphoric acid together, using an excess of the latter and at a temperature in excess of 185° C., crystallizing the said pyrophosphate together with a minor proportion of orthophosphate by cooling the reacting mass to below the said temperature, and freeing the crystals from said acid.

7. The process of producing a leavening acid consisting of a major proportion of anhydrous calcium acid pyrophosphate with a minor proportion of monocalcium orthophosphate comprising reacting lime and strong phosphoric acid together in the presence of a high boiling organic liquid at a temperature in excess of 185° C., the proportions of lime and acid being substantially the theoretical proportions to produce said calcium acid pyrophosphate, and then cooling the mass to crystallize said calcium acid pyrophosphate together with said monocalcium orthophosphate.

ARTHUR E. HUFF.